Nov. 14, 1939.   A. V. BEDFORD   2,179,607
CATHODE RAY DEFLECTING CIRCUITS
Filed Sept. 22, 1936

Inventor
Alda V. Bedford
Attorney

Patented Nov. 14, 1939

2,179,607

UNITED STATES PATENT OFFICE 2,179,607

CATHODE RAY DEFLECTING CIRCUITS

Alda V. Bedford, Collingswood, N. J., assignor to Radio Corporation of America, a corporation of Delaware Application September 22, 1936, Serial No. 101,923

8 Claims. (Cl. 250—27)

My invention relates to deflecting circuits for cathode ray tubes or the like and particularly to circuits for producing a flow of current of the desired wave shape through an inductance coil such as a deflecting coil.

For deflecting a cathode ray for television purposes or for providing a time axis in a cathode ray oscillograph it is often desirable to produce in a deflecting coil a flow of current having a substantially pure saw-tooth wave form. Largely because of distributed capacity across the deflecting coil difficulty is usually experienced in making the gradually sloping or useful deflecting portion of the saw-tooth wave a straight line, there being undesired transient effects. One way of avoiding such transient effects is to shunt a damping circuit across the deflecting coil. A damping circuit is objectionable in that it absorbs power, thus making necessary larger output tubes for a given amplitude of deflection than would be required otherwise.

It is, accordingly, an object of my invention to provide an improved method of and means for producing through an inductance coil a flow of current having a desired wave shape.

A further object of my invention is to provide an improved method of and means for producing through an inductance coil or other load a flow of current having a substantially pure saw-tooth wave form.

A further object of my invention is to provide an improved deflecting circuit for a cathode ray tube.

In accordance with a preferred embodiment of my invention, the deflecting coils of a cathode ray tube are coupled to the output circuit of a high impedance output tube. I apply to the input circuit of the output tube a voltage having at least two components, one component being the voltage drop across a condenser and another component being the voltage drop across an inductance coil in series with the condenser. The value of this inductance coil is made such with respect to certain circuit constants, including the distributed capacity across the deflecting coils, that the voltage component appearing across the inductance coil causes the tube to supply the entire charging current of the distributed capacity, while the voltage component appearing across the condenser causes the tube to supply the current through the inductance coil. Hence, when a pure saw-tooth voltage wave is generated across the condenser, a similar pure saw-tooth current wave will flow through the inductive load.

Figure 1:
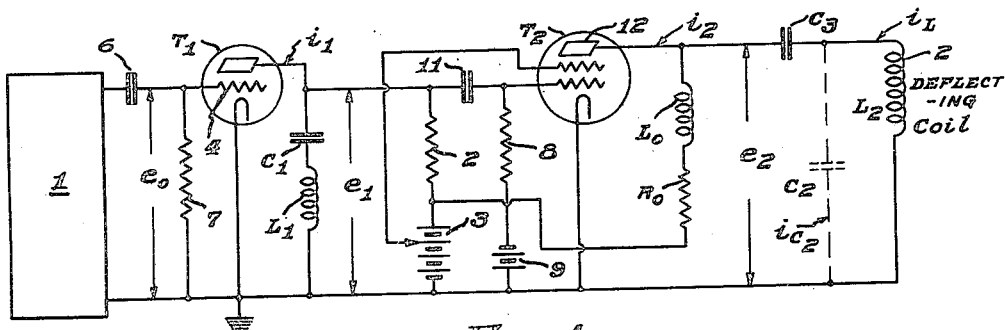
Figure 2:
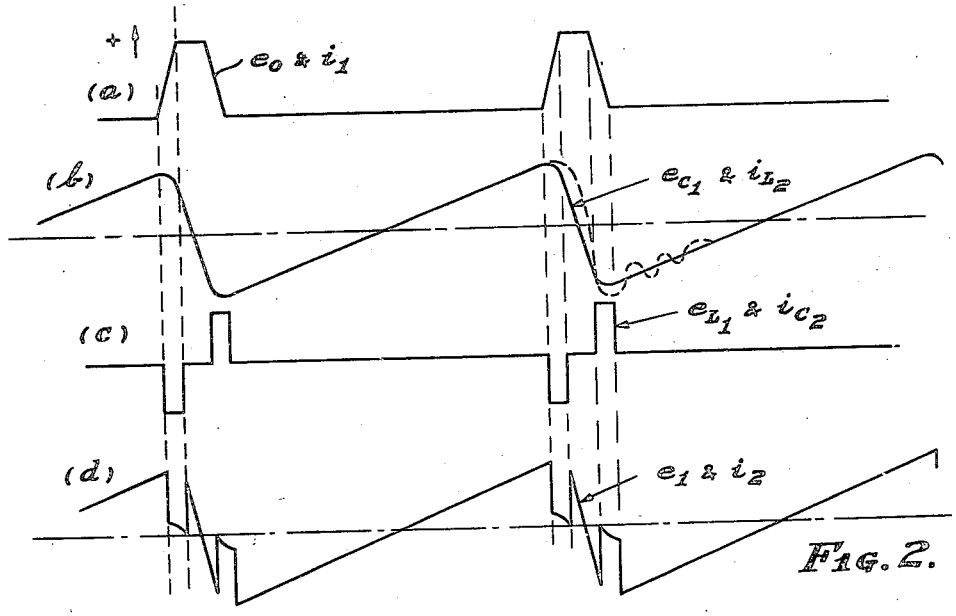
Figure 3A:
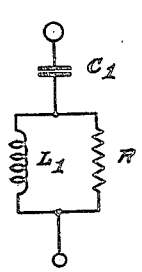
Figure 3B:
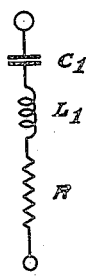
Figure 3C:
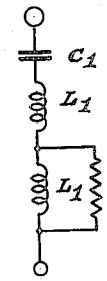
Figure 3D:
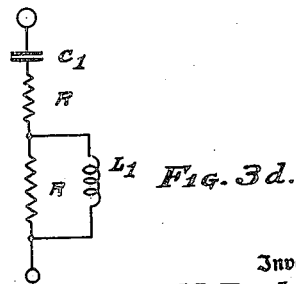

Other objects, features and advantages of my invention will appear from the following description taken in connection with the accompanying drawing in which Figure 1 is a circuit diagram of one embodiment of my invention, Figure 2 is a group of curves which are referred to in explaining my invention, and Figures 3a, 3b, 3c and 3d are views showing networks which may be substituted for a portion of the circuit shown in Figure 1.

Referring to Fig. 1, my invention is shown applied to one deflecting circuit of a television receiver in which it is desired that a flow of current having a saw-tooth wave shape be produced in a deflecting coil indicated at $L_2$. The circuit for producing such a flow of saw-tooth current includes suitable means indicated at 1, such as a blocking oscillator, for producing a positive voltage impulse periodically. Such impulses are shown by the curve "a" in Fig. 2. An oscillator of the type which may be employed is shown in Tolson Patent No. 1,999,378.

Since a high impedance output tube indicated at $T_2$ is employed in this particular embodiment of the invention for supplying saw-tooth current to the deflecting coil $L_2$, a saw-tooth voltage impressed upon the input circuit of the tube $T_2$ would produce a substantially pure saw-tooth current wave in the deflecting coil except for the effect of distributed capacity across the coil.

The desired saw-tooth voltage wave is produced by charging a condenser $C_1$ comparatively slowly through a resistor 2 having a high resistance value from a suitable voltage source such as a battery 3. The condenser $C_1$ is discharged periodically and comparatively rapidly through a discharge tube $T_1$. The condenser discharge is produced by impressing the positive impulses $e_0$ from the source 1 upon the control grid 4 of the tube $T_1$ through a grid condenser 6. The tube $T_1$ is provided with a grid resistor 7 having such resistance compared with the capacity of the grid condenser that the periodic flow of grid current produced by the positive voltage impulses causes the grid 4 to be so negatively biased due to a grid leak biasing action that the tube $T_1$ is biased beyond cut-off between positive voltage impulses.

In accordance with my invention an inductance coil $L_1$ is connected in series with the condenser $C_1$ whereby both the condenser charging current and the condenser discharging current flow through both the condenser $C_1$ and the inductance coil $L_1$. The purpose of inductance coil $L_1$ is to supply a voltage component which will supply the charging current of the distributed capacity across the deflecting coil $L_2$.

The output tube $T_2$ has an input circuit including a grid resistor 8 and means such as a biasing battery 9 for maintaining the tube properly biased for Class A operation, that is, for non-distorting amplification. The voltage $e_1$, which is the sum of the voltage drop across the condenser $C_1$ and the voltage drop across the inductance coil $L_1$, is impressed across the input circuit of the tube $T_2$ through a coupling condenser 11.

The plate 12 of the tube $T_2$ is supplied with a suitable positive voltage from the battery 3 or other suitable source through a plate resistor $R_o$ and an inductance coil $L_o$. The plate circuit $R_o$—$L_o$ preferably is made to have a very high impedance relative to that of coil $L_2$. The deflecting coil $L_2$ is coupled across the output circuit of the tube $T_2$ through a coupling condenser $C_3$. The distributed capacity across the coil $L_2$, the plate 12, coil $L_o$, and wiring is indicated at $C_2$.

As previously explained, the voltage impulses $e_o$ cause a saw-tooth wave to appear across the condenser $C_1$, this voltage wave being shown in curve "b" in Fig. 2. At the same time there is produced across the coil $L_1$ a voltage $$e_{L_1}$$

having the wave shape shown by the curve "c" in Fig. 2. The voltage $$e_{C_1}$$

and the voltage $$e_{L_1}$$

add to produce the voltage $e_1$ which is impressed across the input circuit of tube $T_2$. The wave shape of the voltage $e_1$ is shown by the curve "d" in Fig. 2.

It should be understood that the voltage impulses $e_o$ need not have the exact wave shape shown in the drawing and that in general they will be neither perfectly rectangular impulses nor impulses with straight sloping sides and sharp corners. However, the particular wave shape of the impulses $e_o$ shown on the drawing facilitates drawing the several curves. It may be noted that, in general, the tops of the impulses $e_o$ are clipped off as a result of the grid of tube $T_1$ being driven positive and thus lowering the input impedance of the tube.

By making the plate circuit $R_o$—$L_o$ of the output tube very large compared with the impedance of the deflecting coil $L_2$ and by making the impedance of the coupling condenser $C_3$ small compared to that of the coil $L_2$, the current $i_2$ supplied to the coil $L_2$ and to the condenser $C_2$ will have the same wave shape as the voltage $e_1$ impressed upon the input circuit of tube $T_2$.

If the distributed capacity $C_2$ were not present, a saw-tooth wave such as that appearing across condenser $C_1$ would cause a flow of saw-tooth current through the current $L_2$ such as shown by the curve "b" in Fig. 2. Because of the distributed capacity, however, if a saw-tooth voltage only were supplied to the input circuit of tube $T_2$ and if no damping were provided the current flowing through the deflecting coil would contain transients as indicated by the dotted line curve as shown in Fig. 2 at "b". These transients are produced by oscillations of the circuit including the coil $L_2$ and the condenser $C_2$. Under these conditions it is obvious that the charging current for the capacity $C_2$ is supplied from the inductance coil $L_2$. In other words, during the period of oscillation the coil $L_2$ feeds energy into the capacity $C_2$ and the capacity $C_2$ next feeds energy back into the coil $L_2$.

If the charging current for the capacity $C_2$ were supplied by a voltage component impressed upon the input circuit of tube $T_2$, the deflecting coil $L_2$ would have no tendency to feed current into the capacity $C_2$ and the circuit $L_2$—$C_2$ would have no tendency to oscillate.

It can be shown that by making the inductance coil $L_1$ of the proper inductance value, the voltage appearing across it will supply the exact amount of charging current required by the distributed capacity $C_2$ whereby the voltage appearing across condenser $C_1$ has only to supply the current for the inductance coil $L_2$. This is shown by the following equations, it being assumed that the output tube $T_2$ is of the high impedance type such as a screen grid tube, that its plate circuit $R_o$—$L_o$ is very large compared with the impedance of the inductance coil $L_2$, and that the coupling condenser $C_3$ has small impedance compared with that of the inductance coil $L_2$. Also, it may be noted that the equations are applicable only to the alternating current components of current since the coupling condensers in the deflecting circuit do not pass the direct current components.

The voltage $e_1$ which is supplied to the input circuit of tube $T_2$ may be expressed as follows:

$$e_1 = L_1\frac{di_1}{dt} + \frac{1}{C_1}\int i_1 dt \qquad (1)$$

where $L_1$ is the inductance of coil $L_1$ and $C_1$ is the capacity of condenser $C_1$.

The resulting current appearing in the plate circuit of tube $T_2$ may be expressed as follows:

$$i_2 = Ge_1 = GL_1\frac{di_1}{dt} + \frac{G}{C_1}\int i_1 dt \qquad (2)$$

where $G$ is the mutual conductance of the tube $T_2$.

As previously explained, in order to avoid the undesired transients in the deflecting coil we wish the voltage appearing across $C_1$ to supply the current for the coil $L_2$ and the voltage appearing across $L_1$ to supply the charging current for the capacity $C_2$. We shall now assume that the two components of the current $i_2$ produced by these voltages divide in the desired manner, that is, it will be assumed that the current $$GL_1\frac{di_1}{dt}$$

which is the current component produced by the voltage across the coil $L_1$, is the charging current $$i_{C_2}$$

for the capacity $C_2$ and that the current $$\frac{G}{C_1}\int i_1 dt$$

which is the current component produced by the voltage appearing across $C_1$, is the current $$i_{L_2}$$

flowing through the inductance coil $L_2$. It will be noted that under such conditions if the capacity $C_2$ were made smaller, there being no change in the rest of the circuit, some of the current produced by the voltage across the coil $L_1$ would flow through the coil $L_2$ while, if the capacity $C_2$ were made larger, some of the current produced by the voltage across $C_1$ would flow into $C_2$.

It will now be seen whether a possible condition of circuit operation has been assumed.

The voltage across coil $L_2$ due to current $i_{L_2}$ is $$e_{L_2} = L_2 \frac{di_{L_2}}{dt} = L_2 \frac{d\left(\frac{G}{C_1}\int i_1 dt\right)}{dt} = \frac{L_2 G}{C_1} i_1 \quad (3)$$

where $L_2$ is the inductance of coil $L_2$.

The voltage across distributed capacity $C_2$ due to current $i_{C_2}$ is $$e_{C_2} = \frac{1}{C_2}\int i_{C_2} dt = \frac{1}{C_2}\int \left(GL_1 \frac{di_1}{dt}\right) dt = \frac{GL_1}{C_2} i_1 \quad (4)$$

but $$e_{C_2} = e_{L_2} = e_2 \quad (5)$$

then by equating (3) and (4) we get $$\frac{L_2 G}{C_1} i_1 = \frac{GL_1}{C_2} i_1 \quad (6)$$

or $$L_1 = \frac{L_2 C_2}{C_1} \quad (7)$$

It is apparent therefore that if coil $L_1$ is given the proper inductance value with respect to $L_2$, $C_2$ and $C_1$ the desired condition which was assumed may be obtained; that is, of $L_1$ has a value given by Equation (7) then $$i_{L_2} = \frac{G}{C_1} \int i_1 dt \quad (8)$$

for any current $i_1$.

In other words, the current flowing through inductance coil $L_2$ is instantaneously proportional to the integral of the curent through $C_1$, which is the voltage across $C_1$.

It will be understood that the curves shown in Fig. 2 are for a specific case and that the invention applies to cases where currents having wave shapes other than saw-tooth are to be passed through an inductance coil $L_2$.

In the specific case ilustrated, the current $i_1$ appearing in the output circuit of tube $T_1$ is a series of impulses as shown by the curve "a" in Fig. 2. By Equation (8) the current flowing through the deflecting coil $L_2$ is proportional to the time integral of $i_1$. Such an integral is a good saw-tooth wave as shown by the curve "b" in Fig. 2.

The voltage appearing across coil $L_1$ and the current flowing through the distributed capacity $C_2$ have the same wave shape as indicated by the curve "c" in Fig. 2, this being the first derivative of the current $i_1$. The voltage $e_1$ has the same wave shape as the current flowing through $C_2$ and $L_2$ combined, that is, the same wave shape as current $i_2$.

It has been stated that the voltage $e_{L_1}$ appearing across coil $L_1$ is the first derivative of the current $i_1$. It is also true that the wave-shape of the current $i_1$ is the first derivative of the saw-tooth voltage wave appearing across condenser $C_1$. It follows that the voltage appearing across coil $L_1$ is the second derivative of the voltage appearing across condenser $C_1$. Therefore the voltage supplying charging current to the distributed capacity $C_2$ is the second derivative of the voltage supplying deflecting current to the coil $L_2$. Likewise, the wave-shape of the current $i_{C_2}$ is the second derivative of the current $i_{L_2}$ In some circuits the impedance of the output tube $T_2$ may not be sufficiently high compared to that of the deflecting coil $L_2$ to avoid distortion of the saw-tooth wave. However, as has been pointed out in Patent 1,999,378, distortion caused by this circuit condition may be avoided by adding an impulse component to the saw-tooth component. Such an impulse component may be provided in addition to the necessary voltage for supplying charging current to the distributed capacity by means of any one of the circuits shown in Figs. 3a, 3b, 3c and 3d. In these figures the condensers and inductance coils $C_1$ and $L_1$, respectively, correspond to the condenser and inductance coil having the same reference characters in Fig. 1. Any of these networks may be substituted for the network $C_1$—$L_1$ in Fig. 1 in the event that the impedance of tube $T_2$ is not high enough.

From the foregoing description it will be apparent that various modifications may be made in my invention without departing from the spirit and scope thereof and I desire, therefore, that only such limitations may be imposed thereon as are necessitated by the prior art and set forth in the appended claims.

I claim as my invention:

1. The method of producing a flow of current of desired wave shape through an inductance coil having distributed capacity shunted thereacross which comprises producing current which includes one component having said desired wave shape and which includes another component having a wave shape which is the second derivative of said one component, and supplying said current to said inductance coil and distributed capacity, said last component having a magnitude substantially equal to the charging current of said distributed capacity.

2. The method of operating a circuit including an electric discharge tube which has an inductance coil coupled to its output circuit, there being distributed capacity across said inductance coil, said method comprising the steps of producing a voltage having a certain wave shape, producing a voltage having a wave shape which is the second derivative of said certain wave, adding said voltages and impressing them across the input circuit of said tube, said second voltage being of the correct value to supply a current in said output circuit substantially equal to the charging current of said distributed capacity.

3. In a circuit for producing a flow of current having a certain wave shape through an inductance coil, there being distributed capacity across said coil, a condenser and a second inductance coil in series, means for producing through said condenser and second coil a current flow such that there appears across said condenser a voltage having said desired wave shape, an electric discharge tube having an input circuit and an output circuit, means for coupling said first inductance coil to said output circuit, and means for impressing the voltages appearing across said condenser and said second coil upon said input circuit, said second coil having such inductance that the voltage appearing thereacross causes said tube to supply the charging current for said distributed capacity.

4. In combination, a network including a condenser and an inductance coil in series, means for charging said condenser at least in part through said inductance coil, means for discharging said condenser at least in part through said inductance coil, an electric discharge tube having an input circuit and an output circuit, an inductance coil having distributed capacity thereacross, means for coupling said last coil to said output circuit, and means for impressing the voltage appearing across said network upon said input circuit, the inductance $L_1$ of the first inductance coil being determined by the equation $$L_1 = L_2 \frac{C_2}{C_1}$$

where $L_2$ is the inductance of the second coil, where $C_2$ is the value of said distributed capacity and where $C_1$ is the capacity of said condenser.

5. In combination, a network including a condenser and an inductance coil in series, means for charging said condenser at least in part through said inductance coil, means for discharging said condenser at least in part through said inductance coil, an electric discharge tube having an input circuit and an output circuit, an inductance coil having distributed capacity thereacross, means for coupling said last coil to said output circuit, and means for impressing the voltage appearing across said network upon said input circuit, said network including a resistor.

6. In combination, a network including a condenser and an inductance coil in series, means for charging said condenser at least in part through said inductance coil, means for discharging said condenser at least in part through said inductance coil, an electric discharge tube having an input circuit and an output circuit, an inductance coil having distributed capacity thereacross, means for coupling said last coil to said output circuit, and means for impressing the voltage appearing across said network upon said input circuit, said network including a resistor in series with said condenser and said first inductance coil.

7. In combination, a network including a condenser and an inductance coil in series, means for charging said condenser comparatively slowly through said coil at a substantially uniform rate, means for periodically discharging said condenser comparatively rapidly through said coil whereby a saw-tooth voltage is produced across said condenser, an electric discharge tube having an input circuit and an output circuit, a deflecting coil coupled to said output circuit, said deflecting coil having distributed capacity thereacross, and means for impressing the voltage appearing across said condenser and said first coil upon said input circuit, said first coil having substantially an inductance value of $L_1$ determined by the equation $$L_1 = L_2 \frac{C_2}{C_1}$$

where $L_2$ is the inductance of said deflecting coil, $C_2$ is the value of said distributed capacity, and $C_1$ is the capacity of said condenser.

8. In a circuit for generating a saw-tooth wave in a coil having shunt capacitance, an impedance including a condenser and an inductance coil connected in series, means for causing an impulse wave of current to flow in said impedance whereby a voltage wave is generated thereacross, an amplifier having an input circuit and an output circuit, means for impressing said voltage wave upon said input circuit, and means for connecting said output circuit to said first coil, the inductance $L_1$ of said inductance coil being determined by the equation $$L_1 = L_2 \frac{C_2}{C_1}$$

where $L_2$ is the inductance of said first coil, where $C_2$ is the value of said shunt capacitance, and where $C_1$ is the capacity of said condenser.

ALDA V. BEDFORD.